July 7, 1970 J. P. FOLEY 3,518,783

TELEPHONE INDEX HOUSING ARRANGEMENTS

Filed April 25, 1968 2 Sheets-Sheet 1

INVENTOR.
JAMES P. FOLEY

BY

Ward, McElhannon, Brooks & Fitzpatrick
ATTORNEYS

TELEPHONE INDEX HOUSING ARRANGEMENTS

Filed April 25, 1968 2 Sheets-Sheet 2

INVENTOR.
JAMES P. FOLEY
BY
Ward, McElhannon, Brooks & Fitzpatrick
ATTORNEYS 3,518,783

TELEPHONE INDEX HOUSING ARRANGEMENTS

James P. Foley, 748 Forest Ave.,
Larchmont, N.Y. 10538

Filed Apr. 25, 1968, Ser. No. 724,046
Int. Cl. G09f *3/00*
U.S. Cl. 40—336 8 Claims

ABSTRACT OF THE DISCLOSURE

Telephone index arrangements wherein a plastic housing is configured to clip onto the underside of a telephone interiorly of the telephone cover and to provide a readily accessible index. The index is pivotally mounted inside a channel in the plastic housing.

This invention relates to telephone index devices and more particularly it concerns novel constructions which permit telephone index information such as names and telephone numbers to be held in association with the telephone for convenient reference.

The present invention is particularly useful in connection with a more compact type telephone, for example, the Trimline design wherein the dial is located in the handle of the telephone. The compact telephone designs are characterized by an elongated, generally rectangular, cover member generally of hard plastic material, which fits over a generally rectangularly shaped flat metal base member. The base member serves as a chassis for carrying the various electrical components of the telephone. The top of the cover member is formed as a cradle for carrying the telephone hand set.

Prior known telephone index arrangements which were capable of becoming attached to the underside of older model telephones are not well suited for use in conjunction with the newer, more compact, rectangularly configured telephone structures. In the first place, the new structures do not lend themselves to proper attachment by the telephone index device according to previously known techniques. In the past, metal clips of spring steel were utilized around the periphery of the telephone index device and these clips were arranged to clamp on the outside of the cover member of the telephone itself. The cover member of the newer type telephones, however, extends straight upward from its lower edge all around the telephone and a clip such as previously known would have to extend completely to the top of the telephone in order to attach the indexing device to the bottom thereof. Additionally, the newer type rectangularly shaped telephone structures do not provide sufficient room between the legs thereof to accommodate telephone sheets of reasonable size. Moreover, even the overall bottom dimensions of the outer cover would not provide sufficient room to permit both telephone index sheets and sheet supporting means of the type used in conjunction with previously known telephone index devices.

The present invention overcomes these disadvantages of the prior art and permits the use of a telephone indexing device in close association with a telephone structure and in such a manner that the telephone index information may easily and conveniently be obtained and utilized.

According to one aspect of the present invention, there is provided a telephone index device comprising a frame member having vertical walls which sit underneath the vertical walls of the cover member of a telephone and extend completely around the lower periphery thereof. In association with these vertical walls of the frame member, there are provided a plurality of wedge-like elements which extend straight upwardly from the upper edges of these walls. These wedge elements are configured and dimensioned such that as the telephone itself is set down upon the frame member the wedge elements enter in between the outer cover of the telephone and the telephone base member and thereby secure the frame member onto the bottom of the telephone. The frame member is provided with a horizontally extending slot-like channel which opens along one side thereof to permit insertion of telephone index sheet carrying means.

According to a further aspect of the present invention, there is provided a novel arrangement for maintaining the index sheets in the index sheet holding frame whereby the sheets may be securely held by the frame completely hidden under the telephone, and yet may be conveniently withdrawn for ready reference. According to this further aspect of the invention, the index sheet carrying channel formed in the frame member of the telephone index device opens out along one of the longer sides thereof and pivot means are provided near one end of the channel opening for pivotally securing the telephone index means to the frame member so that such index means may be disposed entirely within the frame member and yet may swing out therefrom. This pivot means preferably comprises an index sheet carrying element pivotally mounted within the frame member and containing a small extension which protrudes out from the channel when the index sheet arrangement is positioned fully within the channel. By pushing sideways on this projection, the index holding means may be caused to pivot out from the channel thus bringing the index sheet along with it.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

Specific embodiments of the invention have been chosen for purposes of illustration and description, and are shown in the accompanying drawings forming a part of the specification, wherein.

Figures 1, 2, 4, 5:
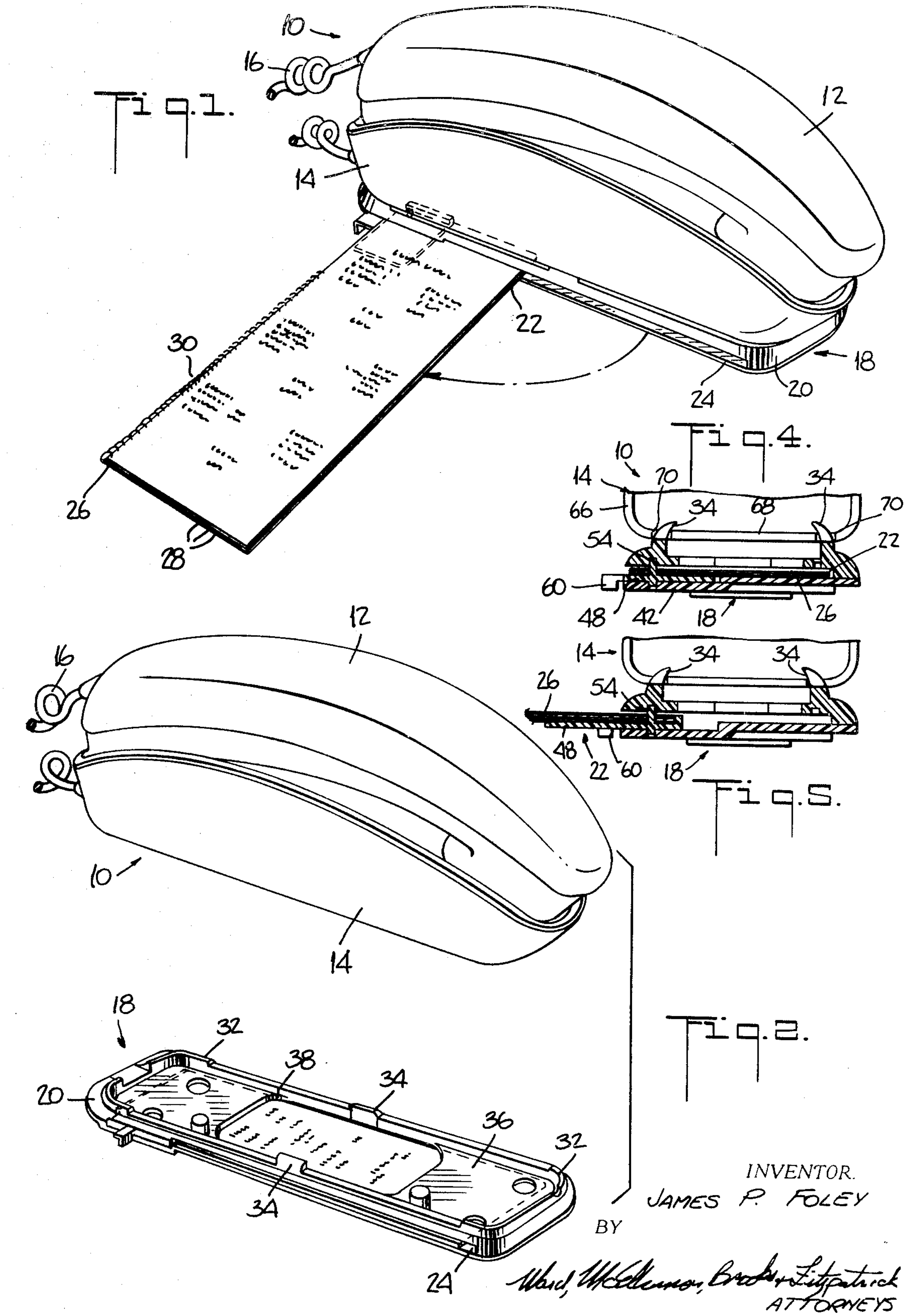
FIG. 1 is a perspective view of a telephone mounted on an opened indexing device in which the invention is embodied.
FIG. 2 is a view similar to FIG. 1 but showing the telephone slightly removed from the telephone index device and showing the telephone index in closed condition.
FIG. 4 is a fragmentary cross section view of the telephone index device of FIGS. 1–3 as it appears in closed condition.
FIG. 5 is a view similar to FIG. 4 showing the telephone index device in opened condition.

In FIG. 1 there is shown a cradle type telephone 10 including a hand set 12 and a body portion 14. The hand set 12, which is connected to the body portion 14 by means of a cord 16, rests upon the top of the body portion 14 when the telephone is not in use.

The telephone 10 is of a relatively new compact design and has a dial wheel (not shown) located along the underside of the hand set 12. This type telephone, which is popularly known as the Trimline telephone is of elongated, generally rectangular plan configuration. Both the hand set 12 and the body portion 14 are of plastic material; and the body portion 14 serves as a cover to enclose various electronics components (not shown) which are mounted on a flat metal base member (also not shown).

A telephone index device 18 is fitted to the underside of the telephone 10. The telephone index device comprises a frame member 20 and an index carrier 22. The frame member 20 is fitted to the underside of the body portion 14 of the telephone 10 and serves as a mounting for the telephone. The frame member 20 is provided along one of its longitudinal edges with an elongated channel opening 24. The channel opening 24 extends horizontally inwardly to provide a rectangular recess for the index carrier 22. The index carrier 22 itself is a flat rectangular member made of plastic material and arranged to be pivotally connected near one corner thereof to the frame member 20 near one end of the channel opening 24. A book-like index arrangement 26 is mounted on the surface of the index carrier 22 to swing with the index carrier into the channel opening 24 of the frame member 20. The index arrangement 26 is made up of a plurality of index pages 28 held together along one longitudinal edge by means of a spiral wire binding 30. This allows the pages 28 to be opened individually and to lie flatly for easy and convenient reference when the index carrier 22 is in its opened position as shown in FIG. 1.

Turning now to FIG. 2 it will be seen that the frame member 20 is built up of molded plastic elements configured to form a housing. Along the upper edge of the frame member 20 there are provided upstanding guide lugs 32 at the corners and these guide lugs 32 fit up between the cover and base members of the telephone 10 to ensure that it remains in proper registry on the telephone index 18. There are additionally provided along the upper edge of the frame member 20 a pair of attachment tabs 34. These attachment tabs are molded integrally with the upper portion of the frame member 20 and serve to hook over the telephone base member in a manner to be described.

The frame member 20 as shown in FIG. 2 is also provided with an upper floor 36 which includes a large central rectangular cutout 38 near the center thereof. As can be seen in FIG. 2, the cut out 38 provides communication to the interior of the channel opening 24 in which the index arrangement 26 is kept in its closed condition.

Figures 3, 6, 7, 8, 9, 10:
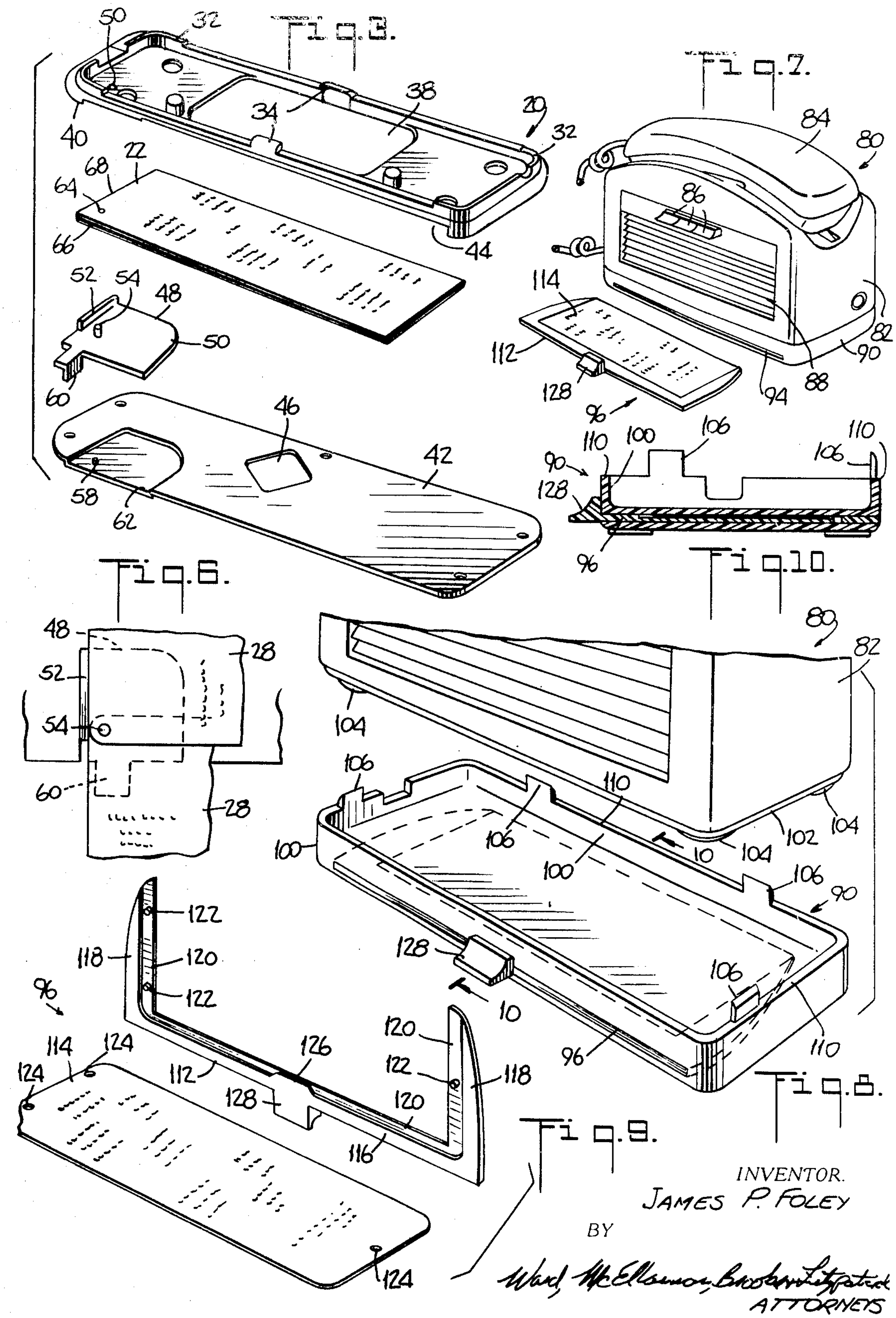
FIG. 3 is an exploded view of the telephone index device shown in FIG. 2.
FIG. 6 is a fragmentary plan view of a portion of the index device of FIG. 2 in opened condition.
FIG. 7 is a perspective view of a telephone index device attached to a telephone and forming a second embodiment of the present invention.
FIG. 8 is a view similar to FIG. 7 showing the telephone slightly removed from the frame member of the telephone index device.
FIG. 9 is an exploded view of an index sheet carrier used in connection with the index device of FIG. 7.
FIG. 10 is a section view taken along line 10—10 of FIG. 8.

Turning now to FIG. 3 it will be seen that the frame member 20 includes an upper portion 40 on which the guide lugs 32, the attachment tabs 34 and the upper floor 36 are formed, and a lower floor portion 42 which is secured to the underside of the upper portion 40. The upper portion 40 is formed with a recess 44 which cooperates with the lower floor portion 42 to define the channel 24 when the upper and lower portions 40 and 42 are in assembly. The lower floor portion 42 is additionally provided with a central opening 46 which, when the index carrier 22 is swung to its outward position as shown in FIG. 1, communicates with the cut out 38 in the upper floor of the frame member 20 so that access may be had to certain of the adjustable elements (e.g., the bell volume control) for adjustment thereof without the necessity of removing the entire telephone index device 18.

There is additionally provided an index actuator 48, which may be of molded plastic. The index actuator 48 includes a generally rectangular flat base portion 50 and a slightly raised edge 52 along one of its sides. Toward the corner closest to the raised edge 52 there is provided an upstanding lug 54 which extends through the base portion 50 and when extends into openings 56 and 58 in the upper and lower portions 40 and 42 of the frame member 20 when these two items are in assembly. This allows the index actuator 48 to pivot about the lug 54 during operation of the device. An actuator tab 60 protrudes out from the raised edge 52 to provide for convenient actuation of the device.

The base portion 50 of the index actuator 48 rests in an actuator recess 62 formed in the lower floor portion 42. The recess 62 is approximately equal in depth to the thickness of the base portion 50 so as to provide an even surface on the floor portion 42 for supporting the index carrier 22 when it is in its closed condition.

The index carrier 22, as shown in FIG. 3 extends outwardly beyond the index arrangement 26 and is provided toward one corner thereof with an attachment hole 64. This attachment hole fits over the upstanding lug 54 on the index actuator 48 when the device is put into assembly. The adjacent edges near the attachment hole 64 (indicated at 66 and 68) abut the raised edge 52 of the index actuator 48 so that any pivotal movement of the index actuator 48 produces a corresponding pivotal movement of the index carrier 22, and, of course, the index arrangement 26.

Turning now to FIG. 4 it will be seen that when the index carrier 22 is in its closed condition so that it is fully inserted into the channel opening 24 of the frame member 20, no portion of the index carrier 22 or of the index arrangement 26 extends out from the telephone 10. The actuator tab 60, however, extends a slight distance out from the telephone 10 in a position to be easily pushed for withdrawing the index carrier 22. When this takes place, the index carrier 22 pivots about the upstanding lug 54 and swings to an outward position as illustrated in FIG. 5. This swinging movement of the index actuator 48 causes the edge 52 to push against all of the index pages 28 on the carrier 22 so that they swing out for convenient viewing.

Turning now to FIG. 6, it will be seen that after all of the index pages 28 are swung out, they may be spread out to find the desired page. Then all but the desired page may be pivoted back inside the channel opening 24. This return movement of the not-used pages will push against the raised edge 52 of the actuator member 48 and return it also to its initial position. Finally, when the desired page is no longer needed, it, too, may be simply pivoted back inside the channel opening 24.

Reverting to FIGS. 4 and 5, the manner in which the frame member 20 is secured to the underside of the telephone 10 can be seen. As shown in FIGS. 4 and 5, the body portion 14 of the telephone 10 is made up of a plastic cover as indicated at 66. This cover extends down around a flat metal base member 68 on which the various electrical components of the telephone are mounted. The cover 66 is displaced slightly from the base member 68 along its entire periphery to define a slot 70 therebetween. The attachment tabs 34 extend up into this slot for obtaining proper registry of the telephone and the index device and the attachment tabs 34 resiliently hook over the edges of the base member 68 for securing the frame member securely thereto. It will thus be appreciated that even though the outer contours of the telephone body portion 14 do not readily admit of attachment devices; nevertheless, by use of the attachment tabs 34 which extend up between the plastic cover 66 and the base member 68 of the telephone, a very secure and, at the same time, unobtrusive attachment is achieved.

FIGS. 7–10 illustrate a telephone index arrangement according to the present invention which is particularly suitable for telephones of the type which incorporate a dial in the handle thereof and wherein the person using the telephone may not be in a position comfortably to perform manipulative actions at the body portion of the telephone itself. Such situations might occur, for example, in the case of a hospital patient who, while he might be able to grasp the handset and pull it off from the body portion of the telephone, may not be able to sit up and operate dials or look up telephone number information, which is fastened to the telephone body portion.

As shown in FIG. 7, there is provided a telephone 80 having a body portion 82 and a handset 84. The telephone 80 may be provided with a plurality of buttons 86 for internal dialing, intercom dialing or outside dialing, depending upon the particular installation. Additionally, there may be provided a speaker arrangement within the body portion 82 and in such case a speaker output grill 88 would be provided. The body portion 82 of the telephone 80 rests upon a frame member 90; and as indicated in FIG. 7, the outer periphery of the frame member 90 is configured to form an extension of the sides of the telephone base portion 82. The frame member 90 is formed with an elongated channel opening 94 within which an index assembly 96 may fit. As can be seen from FIG. 7, the index assembly 96 is completely removable from the frame member 90 and may be held up away from the telephone body portion 82 for convenient reference during the operation of the telephone dial.

Turning now to FIG. 8, it will be seen that the frame member 90 is formed with upstanding vertical walls 100 which mate with and for continuous extensions of the outer walls of a telephone body portion 82. As can be seen in FIG. 8, the telephone is provided with a lower base plate 102 at the under side thereof and a plurality of short support legs 104 secured to the underside of the base plate 102. The vertical walls 100 of the frame member 90 are provided with upstanding wedge-like attachment tabs which fit up between the base plate 102 of the telephone 80 and the outer covering of the body portion 82.

As can be seen in FIG. 8, the vertical walls 100 are quite thick; however, the attachment tabs 106 are somewhat thinner than the vertical walls 100 and extend upwardly from the inner edges of these walls so that there remains a ledge 110 upon which the outer covering of the body portion 82 of the telephone 80 may rest.

Turning now to FIG. 9, it will be seen that the index carrier 96 comprises a holder 112 and a separate detachable index sheet 114. The holder 112 includes a longitudinal arm 116 and a pair of lateral arms 118 extending out from each end of the longitudinal arm 116. The arms 116 and 118 are formed with a recess 120 along their internally facing edges; and the index sheet 114 fits closely into this recess. The recessed edges of the arms 118 are provided with guide lugs 122 which extend from the wall of the recess 120 and fit into corresponding holes 124 in the sheet 114 to prevent lateral shifting. A centrally located securing tab 126 is formed in the longitudinal arm 116 and this tab extends in spaced relation to the wall of the recess 120 to hold the sheet 114 into the recess. The sheet 114 is of a relatively stiff, though resilient, durable substance such as sheet plastic; and it will be held in place in the holder 112 by the cooperative action of the recess 120, the lugs 122 and the tab 126. On the other hand, the index sheet may easily be replaced by bending it slightly and lifting it out from the holder.

The longitudinal arm 116 of the holder 112 is provided with a tab handle 128 formed along its outer edge. This handle remains outside of the channel opening 94 when the index assembly 96 is fully in place. When desired, the handle 128 may be grasped and pulled to remove the index assembly from the channel opening.

As can be seen in FIG. 10, the holder 112 is configured to fit snugly and slide easily in the channel opening 94 for convenient yet secure storage. At the same time, the holder 112 is internally configured, as illustrated in FIG. 9 with a resilient clamp-type arrangement to hold the index sheet 114 in a secure but removable manner.

Although certain specific embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. A telephone index device for mounting beneath the base of a telephone instrument, said base having side edges which are long relative to the end edges thereof, said device comprising a frame member having sides and ends substantially of the same dimensions, respectively, as said side edges and said end edges of said base, said sides and ends of said frame member having upstanding side and end walls and having portions engageable with said base for supporting said base, the interiors of said walls defining a space for receiving an index sheet therebetween and one of said walls at a side of said frame member having an aperture therein for permitting passage of said index sheet therethrough and into said space, at least one index sheet having sides and ends of dimensions less, respectively, than the side and end dimensions of said frame member, means pivotally mounting said index sheet on said frame member with the pivot axis adjacent the intersection between a side and an end of said sheet and at one end of said aperture and adjacent said one side of said frame member, said pivot axis also being adjacent the side of said index sheet which is adjacent to said one side of said frame member when said sheet is within said space, actuator means extending outwardly from said aperture, engaging said sheet and pivotable about said axis for swinging said sheet around said pivot axis and outwardly from within said space, and a pair of means on said frame member and spaced from each other for securing said frame member to said base, said pair of means being spaced inwardly from said sides of said frame member and extending upwardly and above said sheet for engaging and gripping said base inwardly from the side edges thereof.

2. A telephone index device as set forth in claim 1 wherein said index sheet is rectangular and has a width between the sides thereof substantially equal to the distance between the interiors of the side walls of said frame member.

3. A telephone index device as set forth in claim 1 wherein said actuator means comprises an actuator member mounted to pivot about said axis into and out of said channel and having a surface substantially perpendicular to said axis for receiving said index sheet, said index sheet being mounted on said surface, said member having an arm extending outwardly from said channel and means extending above said surface and engageable with said sheet.

4. A telephone index device as set forth in claim 1, said base having apertures therein spaced inwardly from said edges thereof and wherein said pair of means comprises a pair of upstanding flange elements configured to wedge into said apertures and frictionally engage the walls thereof.

5. A telephone index device as set forth in claim 1 wherein said frame member has an upper wall and a lower wall defining said channel and extending on opposite sides of said index sheet with the upper wall substantially parallel to and adjacent the upper surface of said sheet and with the lower wall substantially parallel to and adjacent the lower surface of said sheet, said upper wall being spaced downwardly from the portions of said frame member engageable with said base, whereby said upper wall is spaced from said base when said telephone instrument is mounted on said device.

6. A telephone index device as set forth in claim 5 wherein said upper wall has an aperture therein overlying said index sheet and said lower wall has an aperture therein vertically aligned with said aperture in said upper wall, said aperture in said upper wall and said aperture in said lower wall providing access to said base when said index sheet is swung outwardly of said channel and without detaching said device from said instrument.

7. A telephone index device comprising a frame member constructed to fit under the base of a telephone, said frame member being formed with a channel which opens out along one edge thereof, a plurality of telephone index sheets configured to fit within said channel in stacked arrangement, an index actuator member pivotally mounted in the channel on an upstanding lug to pivot in the plane of said index sheets, said sheets having a hole thereon near a corner thereof and being mounted on said actuator member with said lug passing through the holes in said sheets, said actuator member being constructed to cause said index sheets to swing out from within said channel upon pivoting movement of said actuator member and having a ledge which extends up over the end edge of at least the lowermost of said sheets whereby the pivoting of said lowermost sheet to an encased position will bring said actuator member to an actuatable position, and an actuator tab extending out from said actuator member and said channel for operating said actuator member.

8. In a telephone index device, a frame member constructed to be attached to the underside of a telephone, said frame member being formed with a slot-like cavity opening out along one edge thereof, an index assembly comprising an index holder configured about its periphery to fit in close drawer sliding relationship with said slot-like cavity and to engage an index sheet along at least three of its edges, said index holder having spaced projections thereon located to engage a pair of opposite edge portions of said sheet from said holder in a first direction and having a channel intermediate said projections and defined by a portion of said holder at one side thereof and a tab on said holder at the other side of said channel, said channel being spaced from said projections and located to receive an edge of said sheet other than said pair of edge portions for preventing removal of said sheet from said holder in a second direction transverse to said first direction, whereby said sheet may be removed from said holder by bending it to disengage it from a projection and then moving it in a second direction to disengage it from said channel.

References Cited

UNITED STATES PATENTS

| | | | |
|---|---|---|---|
| 1,518,876 | 12/1924 | Rosine | 40—336 X |
| 2,432,760 | 12/1947 | Higbee | 40—336 X |
| 2,479,752 | 8/1949 | Lohr | 40—336 X |
| 2,935,805 | 5/1960 | Van Gieson | 40—336 |
| 2,981,021 | 4/1961 | Clark | 40—336 |

EUGENE R. CAPOZIO, Primary Examiner

W. H. GRIEB, Assistant Examiner